United States Patent
Mathews et al.

(10) Patent No.: US 12,445,462 B2
(45) Date of Patent: Oct. 14, 2025

(54) TECHNICAL SUPPORT SCAM PROTECTION

(71) Applicant: Cujo LLC, Walnut, CA (US)

(72) Inventors: James Mathews, Utrecht (NL); Michael Przybilski, Helsinki (FI)

(73) Assignee: Cujo LLC, Covina, CA (US)

( * ) Notice: Subject to any disclaimer, the term of this patent is extended or adjusted under 35 U.S.C. 154(b) by 209 days.

(21) Appl. No.: 18/076,896

(22) Filed: Dec. 7, 2022

(65) Prior Publication Data

US 2024/0195817 A1   Jun. 13, 2024

(51) Int. Cl.
*H04L 9/40* (2022.01)

(52) U.S. Cl.
CPC .................. *H04L 63/1416* (2013.01)

(58) Field of Classification Search
None
See application file for complete search history.

(56) References Cited

U.S. PATENT DOCUMENTS

| | | | |
|---|---|---|---|
| 9,961,093 B1 | 5/2018 | Wittenstein | |
| 10,325,093 B1* | 6/2019 | Kumar | G06F 21/577 |
| 2005/0160280 A1* | 7/2005 | Caslin | H04L 67/535 713/189 |
| 2015/0281266 A1* | 10/2015 | Basil | H04L 67/14 726/23 |
| 2016/0308888 A1* | 10/2016 | Vargas Gonzalez | H04L 63/145 |
| 2016/0337386 A1* | 11/2016 | Ford | H04L 63/1466 |
| 2016/0337390 A1* | 11/2016 | Sridhara | H04L 63/101 |
| 2017/0351859 A1* | 12/2017 | Antonov | G06F 21/566 |
| 2019/0124092 A1* | 4/2019 | Deutschmann | H04L 63/0861 |
| 2019/0166140 A1* | 5/2019 | Krylov | H04L 67/535 |
| 2020/0120107 A1* | 4/2020 | McGrew | G06N 20/00 |
| 2020/0273040 A1* | 8/2020 | Novick | G06Q 20/4016 |
| 2021/0105302 A1* | 4/2021 | Prakash | G06F 11/3438 |
| 2022/0058660 A1* | 2/2022 | Ivanov | G06F 21/554 |
| 2022/0377171 A1* | 11/2022 | Joshi | H04M 3/42085 |
| 2023/0362651 A1* | 11/2023 | Lie | H04W 12/30 |
| 2023/0412617 A1* | 12/2023 | Williams | H04L 63/0236 |

OTHER PUBLICATIONS

Author Unknown, "Remote Access Blocker," F-Secure User Guides, https://help.f-secure.com/product.html?home/safe-windows/latest/en/concept_EB152891D3C14E21AE4270823E92EF45-safe-windows-latest-en, Accessed Dec. 5, 2022, 3 pages.

(Continued)

*Primary Examiner* — Jerry B Dennison
(74) *Attorney, Agent, or Firm* — Dority & Manning, P.A.

(57) ABSTRACT

Data communication of a user apparatus via a customer-premises equipment (CPE) is intercepted. The CPE implements a local area network for the data communication of the user apparatus. First network traffic related to a remote access software in the user apparatus is detected in the data communication. Second network traffic related to an online banking software in the user apparatus is detected in the data communication. The first network traffic and the second network traffic are determined to coincide. In response to determining that the first network traffic and the second network traffic coincide, the first network traffic related to the remote access software in the user apparatus is blocked via the CPE.

22 Claims, 7 Drawing Sheets

(56) References Cited

OTHER PUBLICATIONS

Author Unknown, "Turning on Banking Protection," F-Secure User Guides, https://help.f-secure.com/product.html?home/safe-windows/latest/en/task_591B3C762B54490B8A70CE6B6DB84CAD-safe-windows-latest-en, Accessed Dec. 5, 2022, 3 pages.

Author Unknown, "Using Banking Protection," F-Secure User Guides, https://help.f-secure.com/product.html#/home/safe-windows/latest/en/task_E2F07DB214B444C5BB1972D602DECF96-safe-windows-latest-en, Accessed Dec. 5, 2022, 3 pages.

Extended European Search Report for European Patent Application No. 22211941.4, dated May 19, 2023, 9 pages.

\* cited by examiner

TECHNICAL SUPPORT SCAM PROTECTION

BACKGROUND

The "technical support scam" is a social engineering scam, which targets vulnerable, often technically less experienced people, by convincing them of technical issues with their equipment and the corresponding need to install remote access software. Once the scammer has gained a remote access to the computer of the user, the scammer proceeds to extort money from the user through a variety of means. The technical support scam is a kind of a modern variation of the "confidence trick" performed by a con artist.

SUMMARY

According to an aspect of the disclosure, there is provided subject matter of independent claims.

One or more examples of implementations are set forth in more detail in the accompanying drawings and the detailed description.

BRIEF DESCRIPTION OF DRAWINGS

Some examples will now be described with reference to the accompanying drawings, in which.

DETAILED DESCRIPTION

The following description discloses examples. Although the specification may refer to "an" example in several locations, this does not necessarily mean that each such reference is to the same example(s), or that the feature only applies to a single example. Single features of different examples may also be combined to provide other examples. Words "comprising" and "including" should be understood as not limiting the described examples to consist of only those features that have been mentioned as such examples may contain also features and structures that have not been specifically mentioned. The examples and features, if any, disclosed in the following description that do not fall under the scope of the independent claims should be interpreted as examples useful for understanding various examples and implementations of the invention.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The technical support scam may be initiated through different kinds of first contact to the user. The user may visit a website provided with a malicious popup, which warns the user of a virus on the computer, and the user is asked to contact a call center with a specific telephone number. Alternatively, the user may be cold-called, and the scammer masquerades as a technical support person from a well-known tech company who has detected some unusual activity in the computer of the user.

Next, the scammer needs to establish a remote access connection to the user apparatus of the user. The scammer explains the need for the remote access: to inspect the computer in more detail, and to resolve any found issues. The user may be instructed over the phone to install the remote access software (RAS). The user is instructed to authorize the scammer to connect to the computer of the user. The scammer then runs several typical programs (task manager, event service logs, etc.) of an operating system of the computer of the user and explains that they indicate a significant problem, such as a computer virus infection, thus exploiting the technical naivety of the victim.

The financial transaction part of the scam may be implemented in a variety of different ways. The user may be sold a support contract with a subsequent billing to resolve the alleged issues. The scammer may ask for a one-off service payment, subsequently providing a refund for a part of this payment. However, the refund may be revealed to be accidentally significantly larger, this is known as the "refund scam". The scammer may instruct the victim to open an online banking software, and the scammer may live-edit the markup (in hypertext markup language (HTML), for example) of the online banking software to fraud the user to believe that the user has been refunded too much, and the scammer demands the excessive refund to be paid back. The user will then transfer the requested funds to a bank account of the scammer. Alternatively, the user may be asked to purchase common redeemable monetary alternatives, such as gift-cards, which the scammer may use for a money-laundering operation. The user may be asked to directly or indirectly mail, or otherwise transfer cash through financial service providers, such as through the Western Union®.

Figure 1A:
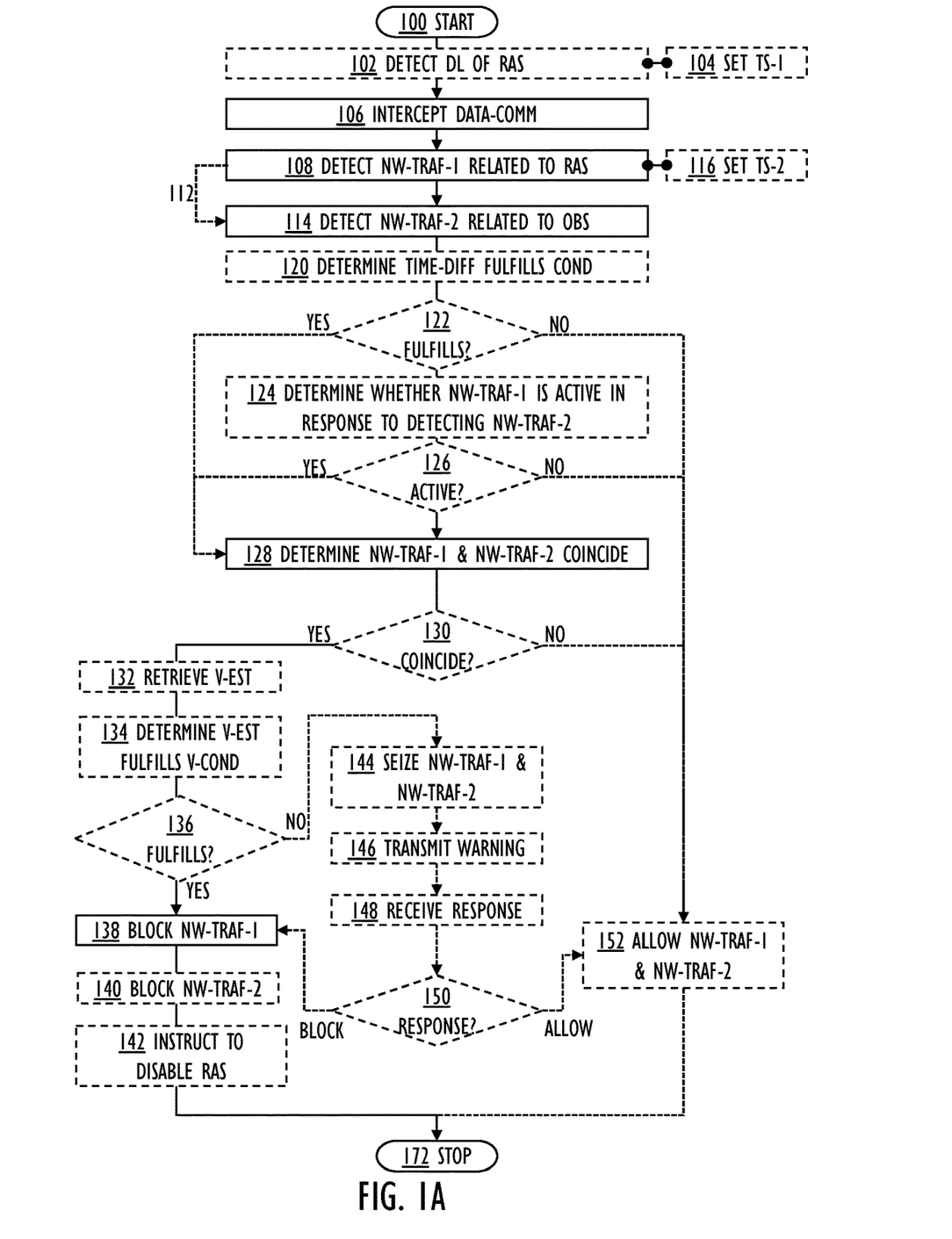
FIG. 1A and FIG. 1B are flowcharts illustrating examples of a method.
Figure 1B:
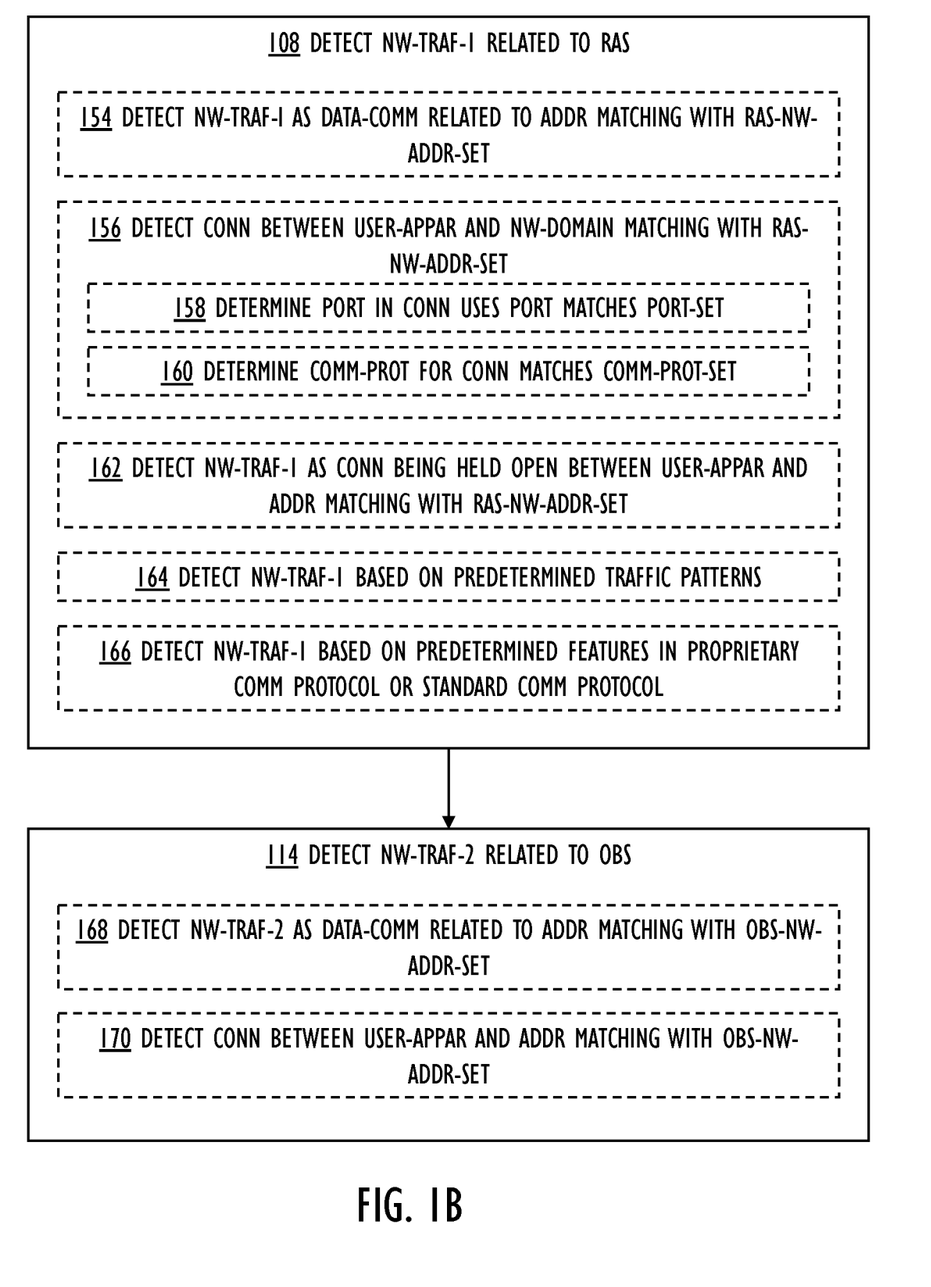

FIG. 1A and FIG. 1B illustrate a method. The method protects the user from the technical support scam and its variations.

The method starts in 100 and ends in 172.

The operations are not strictly in chronological order in FIG. 1A and FIG. 1B, i.e., no special order of operations is required, except where necessary due to the logical requirements for the processing order. In such a case, the synchronization between operations may either be explicitly indicated, or it may be understood implicitly by the skilled person. If no specific synchronization is required, some of the operations may be performed simultaneously or in an order differing from the illustrated order. Other operations may also be executed between the described operations or within the described operations, and other data besides the illustrated data may be exchanged between the operations.

Figure 2:
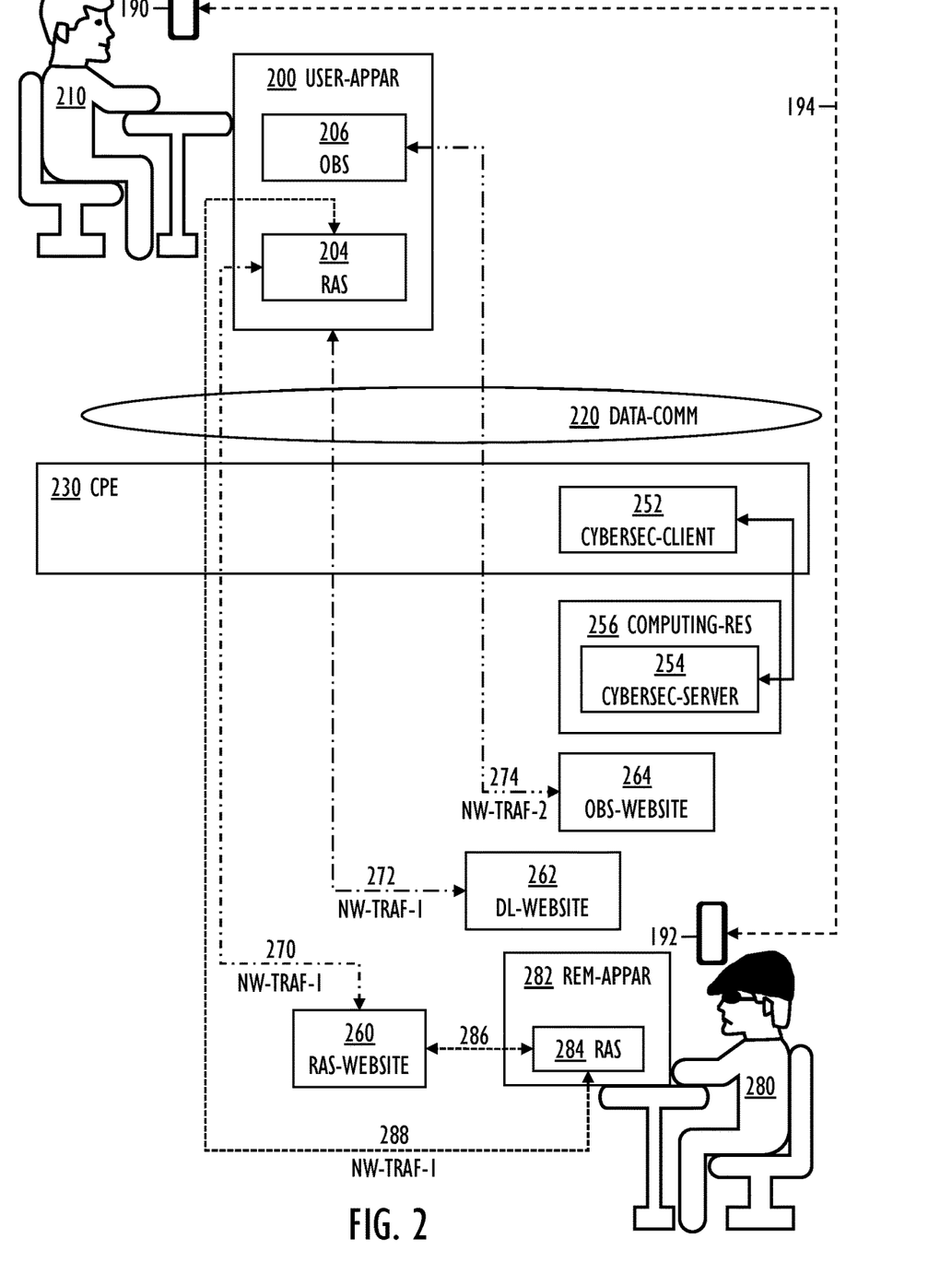
FIG. 2 is a block diagram illustrating an example implementation environment for the method.

FIG. 2 illustrates an example implementation environment for the method. The method may be a computer-implemented method.

First, data communication 220 of a user apparatus 200 via a customer-premises equipment (CPE) 230 is intercepted 106. The CPE 230 implements a local area network for the data communication 220 of the user apparatus 200. Consequently, the CPE 230 may intercept 106 the data communication 220.

As used herein, the term "data communication" 220 refers to the transmission and/or reception of (digital) data by the user apparatus 200. The data communication 220 is transferred using digital data transmission units over a communication medium such as one or more communication channels (implemented by copper wires, optical fibers, and wireless communication using radio spectrum, for example) between the user apparatus 200 and another network node. The data are a collection of discrete values that convey information, or sequences of symbols that may be interpreted, expressed as a digital bitstream or a digitized analog signal, including, but not being limited to: text, numbers, image, audio, video, and multimedia. The data may be represented as an electromagnetic signal (such as an electrical voltage or a radio wave, for example). The digital transmission units may be transmitted individually, or in a series over a period of time, or in parallel over two or more communication channels, and include, but are not limited to: messages, protocol units, packets, and frames. One or more communication protocols may define a set of rules followed by the user apparatus 200 and other network nodes to implement the successful and reliable data communication 220. The communication protocols may implement a protocol stack with different conceptual protocol layers. In a connection-oriented data communication 220, a connection needs to be established for transferring the payload data. In a connectionless data communication 220, the payload data is transferred over different paths with an independent routing.

As used herein, the term "intercepting" 106 refers to user-approved lawful interception or monitoring of the data communication 220, with a purpose and goal of increasing cybersecurity related to the user apparatus 200 and its operating environment. As the data communication 220 is intercepted 106, the data communication 220 is accessed and collected between the transmitting device and the receiving device. The data communication 220 may be intercepted 106 even if the digital data transmission units (such as messages) in the data communication 220 are addressed to the receiving device. The intercepting 106 may be performed in the network, or at some network element, such as at the CPE 230. The intercepting 106 may be implemented so that the data communication 220 is passively monitored, i.e., the data communication 220 is not affected by the intercepting 106. Alternatively, if needed, the intercepting 106 may include a seizing of the data communication 220, i.e., the data communication 220 is actively influenced so that a connection and/or requests and/or responses are blocked until it may be decided whether a cybersecurity action is required.

Next, the intercepted 106 data communication 220 is analyzed. The analysis is performed with a specific cybersecurity point of view. The analysis of the described examples concentrates on detecting and prohibiting the technical support scam from succeeding. To this end, the analysis checks whether two components needed for the technical support scam are active in the user apparatus 200. Internal functioning of the user apparatus 200 need not be checked, and in many use cases, the cybersecurity actions may not operate within the user apparatus 200 (due to the missing cybersecurity software, for example). Consequently, due to intercepting 106 the data communication 220, the analysis is able to detect internal functioning of the user apparatus 200 even without an actual access to the internal functioning of the user apparatus 200, such as checking internally which applications are currently running in the user apparatus 200. The analysis searches in the data communication 220 for a first network traffic 270, 288 related to a (active) remote access software 204 and a second network traffic 274 related to an (active) online banking software 206.

As shown in FIG. 2, the user apparatus 200 is configured to execute the remote access software 204 and the online banking software 206. The remote access software 204 and the online banking software 206 may be stand-alone applications (such as mobile apps), but at least the online banking software may also be implemented with user interface controls within a web browser, for example.

As used herein, the term "remote access software" 204 refers to a remote access and remote control software, whose legitimate use is to enable remote maintenance of the user apparatus 200 of the user 210. A first connection 270, 288 is established between the user apparatus 210 and a remote apparatus 282 via a remote access software website 260, and a second connection 286 is established between the remote access software website 260 and the remote apparatus 282. The remote access connection 288 then operates directly between the user apparatus 200 and the remote apparatus 282. The connections 270, 286, 288 may be secured using unique identifiers and passwords, for example. A well-known remote access software product 204 is TeamViewer®.

As used herein, the term "online banking software" 206 refers to an electronic online payment system, which makes it possible for the user 210 as a customer of a bank or another financial institution to conduct various transactions (including payments). The user 210 needs to authenticate himself/herself with a multi-factor authentication, for example, to be able to use the online banking services provided by the online banking software website 264.

As a result of the analysis, two events related to an active (or executing in the user apparatus 200) software may be detected: first network traffic 270, 288 related to the (active) remote access software 204 in the user apparatus 200 is detected 108 in the data communication 220, and second network traffic 274 related to the (active) online banking software 206 in the user apparatus 200 is detected 114 in the data communication 220.

Detection procedures 108, 114 for the first network traffic 270, 288 and for the second network traffic 274 in the data communication 220 of the user apparatus 200 may be operative at all times. Alternatively, only the first network traffic 270, 288 is searched for continuously from the data communication 220. And, in response to detecting 108, in the data communication 220, the first network traffic 270, 288 related to the (active) remote access software 204 in the user apparatus 200, a search to detect 114, in the data communication 220, the second network traffic 274 related to the (active) online banking software 206 in the user apparatus 200 is performed 112. The search for the second network traffic 274 may be performed during a predetermined time window. The duration of the predetermined time window may be as long as the first network traffic 270, 288 is active.

Figure 3:
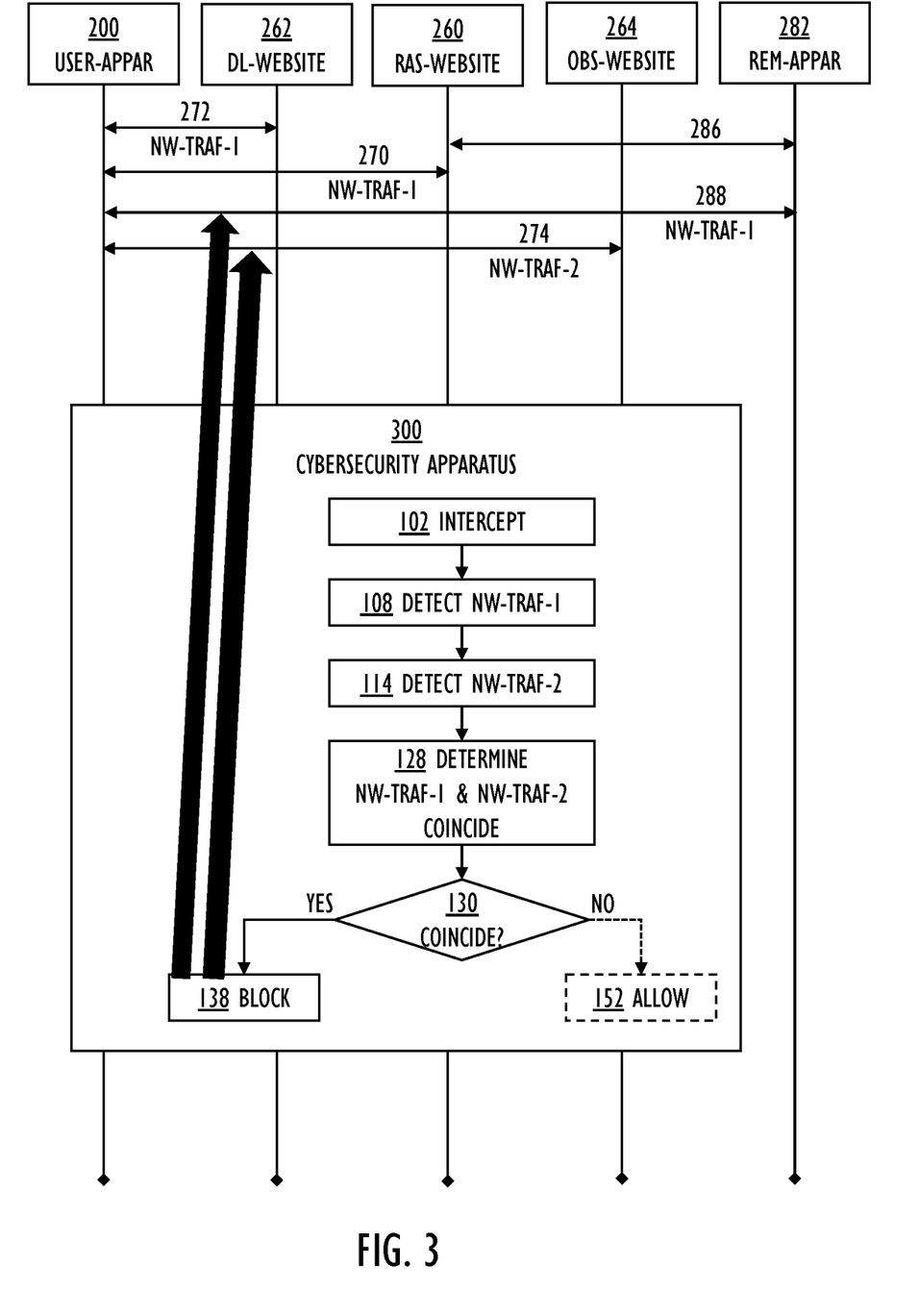
FIG. 3 is a sequence chart illustrating communication between various actors of the method.

FIG. 3 illustrates communication between various actors of the method.

The user apparatus 200 may create a connection 270 using a packet protocol for the remote access software 204 to the remote access software website 260. The remote access software website 260 may host a server application, enabling the remote access of the user apparatus 200 by the remote apparatus 282. The remote apparatus 282 is also running an instance of the remote access software 284 with the connection 286 to the remote access software website 260. Then, the remote access software 284 of the remote apparatus 282 may control the remote access software 204 of the user apparatus 200 via the connection 288.

The user apparatus 200 may create a connection 274 using a packet protocol for the online banking software 206 to the online banking software website 264.

The packet protocols include, but are not limited to, Transmission Control Protocol/Internet Protocol (TCP/IP), User Datagram Protocol/Internet Protocol (UDP/IP), and QUIC, which establishes a multiplexed transport on top of the UDP.

Various Hypertext Transfer Protocol/Hypertext Transfer Protocol Secure (HTTP/HTTPS) requests may then be transferred in the connection 270, 274, 286 (using TCP streams or UDP datagrams, for example).

In the Internet protocol suite, the connection 270, 274, 286, 288 is operated in a link layer, an internet layer, and a transport layer, and the requests transmitted in the connection 270, 274, 286, 288 are operated in an application layer.

The analysis then proceeds by analyzing temporal relationship of the first network traffic 270, 288 and the second network traffic 274. For the technical support scam to succeed, the remote access software 204 and the online banking software 206 need to be active simultaneously, or at least so that an activity period of the remote access software 204 at least partly overlaps with an activity period of the online banking software 206. This may be detected by analyzing whether the first network traffic 270, 288 and the second network traffic 274 coincide. The coincide may refer to the first network traffic 270, 288 and the second network traffic 274 to happen at or near the same time, so that the first network traffic 270, 288 and the second network traffic 274 at least partly overlap (or at least partly happen at the same time), for example. The first network traffic 270, 288 and the second network traffic 274 may be determined to coincide 128 if both traffics 270, 288 and 274 are detected 108, 114 from the data communication 220 that is intercepted 106 at the same time, within a predetermined interception time window lasting a few minutes, for example.

As shown in FIG. 2, the legitimate user 210 is interacting with the remote access software 204 and the online banking software 206 simultaneously. The scammer 280 is using the remote apparatus 282 provided with the remote access software 284 to connect 288 with the remote access software 204 in the user apparatus 200 of the legitimate user 210, and the scammer 280 may even manipulate user actions performed with the online banking software 206 via the remote access connection 288.

As also shown in FIG. 2, the scammer 280 may use a mobile phone 192 to make a voice call 194 to a mobile phone 190 of the legitimate user 210. The scammer 280 may verbally persuade the legitimate user 210 to fall for the scam. Instead of the voice call 194 implemented between the mobile phones 190, 192, another type of a voice communication channel (in a social media application, for example) implemented between the remote apparatus 282 and the user apparatus 200 may be used for the persuasion as well.

As a result of the further analysis, an additional event may be detected: the first network traffic 270, 288 and the second network traffic 274 are determined 128 to coincide.

Checking the result of determining 128 may be implemented with a test in block 130. In response to determining that the first network traffic 270, 288 and the second network traffic coincide 274, the first network traffic 270, 288 related to the (active) remote access software 204 in the user apparatus 200 via the CPE 230 is blocked 138. In this way, the ongoing scam is stopped on its tracks: as the first network traffic 270, 288 is blocked (for example, the first network traffic 288 between the user apparatus 200 and the remote apparatus 282 is inhibited from reaching the addressed recipient), the scammer 280 is prevented from accessing and manipulating the user apparatus 200 of the user 210 using the remote access software 204. The blocking 138 of the first network traffic 270, 288 may be performed by the CPE 230 for the data communication 220 of the user apparatus 200 via a local area network 402 (see FIG. 4).

One way to determine that 128 the first network traffic 270, 288 and the second network traffic 274 happen at or near the same time may be to detect whether the first network traffic 270, 288 is active at the time the second network traffic 274 is detected. It needs to be determined 124 whether the first network traffic 270, 288 is active in response to detecting 114, in the data communication 220, the second network traffic 274 related to the (active) online banking software 206 in the user apparatus 200. Checking the result of determining 124 may be implemented with a test in block 126. In response to determining that the first network traffic 270, 288 is active (the test in block 126 evaluates "YES"), it is finally determined 128 that the first network traffic 270, 288 and the second network traffic 274 coincide, or else (the test in block 126 evaluates "NO"), the first network traffic 270, 288 and the second network traffic 274 via the CPE 230 may be allowed 152.

If the test in 130 evaluates "NO", the first network traffic 270, 288 and the second network traffic 274 may be allowed. This is because the technical support scam needs to have both the remote access software 204 and the online banking software 206 simultaneously active or at least active during a partly overlapping time period.

As shown in FIG. 1A, a vulnerability of the legitimate user 210 may be considered while making the decision to block/allow.

A vulnerability estimate for the user 210 of the user apparatus 200 may be retrieved 132. Additionally, it may be determined 134 that the vulnerability estimate fulfills a predetermined vulnerability condition. Checking the result of determining 134 may be implemented with a test in block 136.

In response to determining that the first network traffic and the second network traffic coincide (the test in block 128 evaluates "YES") and determining that the vulnerability estimate fulfills the predetermined vulnerability condition (the test in block 136 evaluates "YES"), the first network traffic 270, 288 related to the (active) remote access software 204 in the user apparatus 200 via the CPE 230 is blocked 138.

The vulnerability estimate may be based on one or more of an age of the user 210, an amount of past risky network behavior of the user 210, a characteristics vulnerability degree based on an analysis of characteristics of the user 210, a usage vulnerability degree based on an analysis of a past network usage of the user 210.

If the test in block 136 evaluates "NO", the first network traffic 270, 288 and the second network traffic 274 may be seized 144, and a warning related to the eventual technical support scam is transmitted 146 to the user apparatus 200. Additionally, a response from the user apparatus 200 may be received 148 and based on the response 150, the first network traffic 270, 288 and the second network traffic 274 via the CPE 230 may be blocked 138, 140, or allowed 152.

Optionally, in response to determining that the first network traffic 270, 288 and the second network traffic 274 coincide, the second network traffic 274 related to the (active) online banking software 206 in the user apparatus 200 via the CPE 230 is blocked 140 (for example, the second network traffic 274 between the user apparatus 200 and the online banking software website 264 is inhibited from reaching the addressed recipient). This additional operation may be needed to prevent the scam from succeeding. As the second network traffic 274 is blocked, the legitimate user 210 is prevented from completing any transactions with the online banking software 206 for the benefit of the scammer 280.

Optionally, subsequent to blocking 138 the first network traffic 270, 288 related to the (active) remote access software 204 in the user apparatus 200 via the CPE 230, the user apparatus 200 may be instructed 142 to disable the remote access software 204 in the user apparatus 200, by redirecting the second network traffic 274 to a block page providing information and even a warning to the user 210. This operation prevents further use of the remote access software 204, if, for some unexpected reason, the first network traffic 270, 288 bypasses the blocking 138, and the scammer 280 continues to trick the legitimate user 210. The remote access software 204 may be stopped from working or even be removed from the user apparatus 200.

The first network traffic 270, 288 related to the (active) remote access software 204 in the user apparatus 200 may be detected 108 in the data communication 220 in different ways, during a connection (during a connection establishment, and/or during the use of the connection for the data communication 220), for example The first network traffic 270, 288 may be detected 154 as a part of the data communication 220 related to an address matching with a target address in a set of target addresses associated with the remote access software 204. The address and the target address may comprise one or more of an internet protocol (IP) address, a fully qualified domain name (FQDN), a universal resource locator (URL).

FQDN may be defined into a domain name system (DNS). Domain names in DNS are read from right to left:
 the root zone is represented by a full stop (period), which is usually not visible in the web browser address line;
 under the root zone is the top level domain (TLD);
 under these are recursive subdomains (sometimes called a second level subdomain, a third level subdomain, etc.).

For example, the set of target addresses associated with the remote access software 204 may include the following FQDNs:
 RAS-provider-1.com.
 RAS-provider-2.co.uk.
 RAS-provider-3.fi.
 RAS-provider-3.com.
 etc.

The network domains that may be searched for are then RAS-provider-1, RAS-provider-2, RAS-provide-3, etc.

The first network traffic 270, 288 may be detected 156 as a connection between the user apparatus 200 and an address matching with a target address in the set of target addresses associated with the remote access software 204. In order to increase the reliability of the detection 156, it may additionally need to be determined 158 that a port defined in the connection matches with a port in a set of ports associated with the remote access software 204. Alternatively, or additionally, it may need to be determined 160 that a communication protocol used for the connection matches with a communication protocol in a set of communication protocols associated with the remote access software 204.

The first network traffic 270, 288 may be detected 162 as a connection being held open between the user apparatus 200 and an address matching with a target address in the set of target addresses associated with the remote access software 204.

The first network traffic 270, 288 may be detected 164 based on predetermined traffic patterns indicative of the (active) remote access software 204.

The first network traffic 270, 288 may be detected 166 based on predetermined features indicative of the (active) remote access software 204 in a proprietary communication protocol, or a standard communication protocol. The proprietary communication protocol may be owned by a single manufacturer of the remote access software 204. The standard communication protocol may be the Web Real-Time Communication (Web-RTC) protocol as defined by the Internet Engineering Task Force (IETF) in RFC 8831.

The first network traffic may also relate to a download 272 of the remote access software 204 to the user apparatus 200 from a download website 262 as shown in FIG. 3.

Prior to detecting 108, in the data communication 220, the first network traffic 270, 288 related to the (active) remote access software 204 in the user apparatus 200, a download 272 of the remote access software 204 to the user apparatus 200 may be detected 102.

A first timestamp may then be set 104 to a point in time when the download 272 was detected 102. A second timestamp is also set 116 to a point in time when the first network traffic 270, 288 related to the (active) remote access software 204 was detected 108. Next, it is determined 120 that a time difference between the first timestamp and the second timestamp fulfills a predetermined time difference condition. Checking the result of determining 120 may be implemented with a test in block 122. Finally, it is determined 128 that the first network traffic 270, 288 and the second network traffic 274 coincide in response to determining that the time difference between the first timestamp and the second timestamp fulfills the predetermined time difference condition (the test in block 122 evaluates "YES"). Note that this determination 128 does not necessarily require the detection of the second network traffic 274. The download of the remote access software 204 and its instantaneous use may indicate that the scammer 280 is at work. Also, the vulnerability of the user 210 may be considered: if the vulnerability is considered high, the determination 128 may be made with a safety margin to protect the user 210.

In order to increase the reliability of the detection 102, it may additionally need to be determined that software is downloaded from a website matching with a website in a set of websites associated with the remote access software 204. Additionally, or alternatively, it may need to be determined that an identifier of the downloaded software matches with an identifier in a set of identifiers associated with the remote access software 204.

The second network traffic 274 related to the (active) online banking software 206 in the user apparatus 200 may be detected 114 in the data communication 220 in different ways.

The second network traffic 274 may be detected 168 as a part of the data communication 220, the part of the data communication being related to an address matching with a target address in the set of target addresses associated with the online banking software 206.

The second network traffic 274 may be detected 170 as a connection between the user apparatus 200 and an address matching with a target address in the set of target addresses associated with the online banking software 206.

Figure 4:
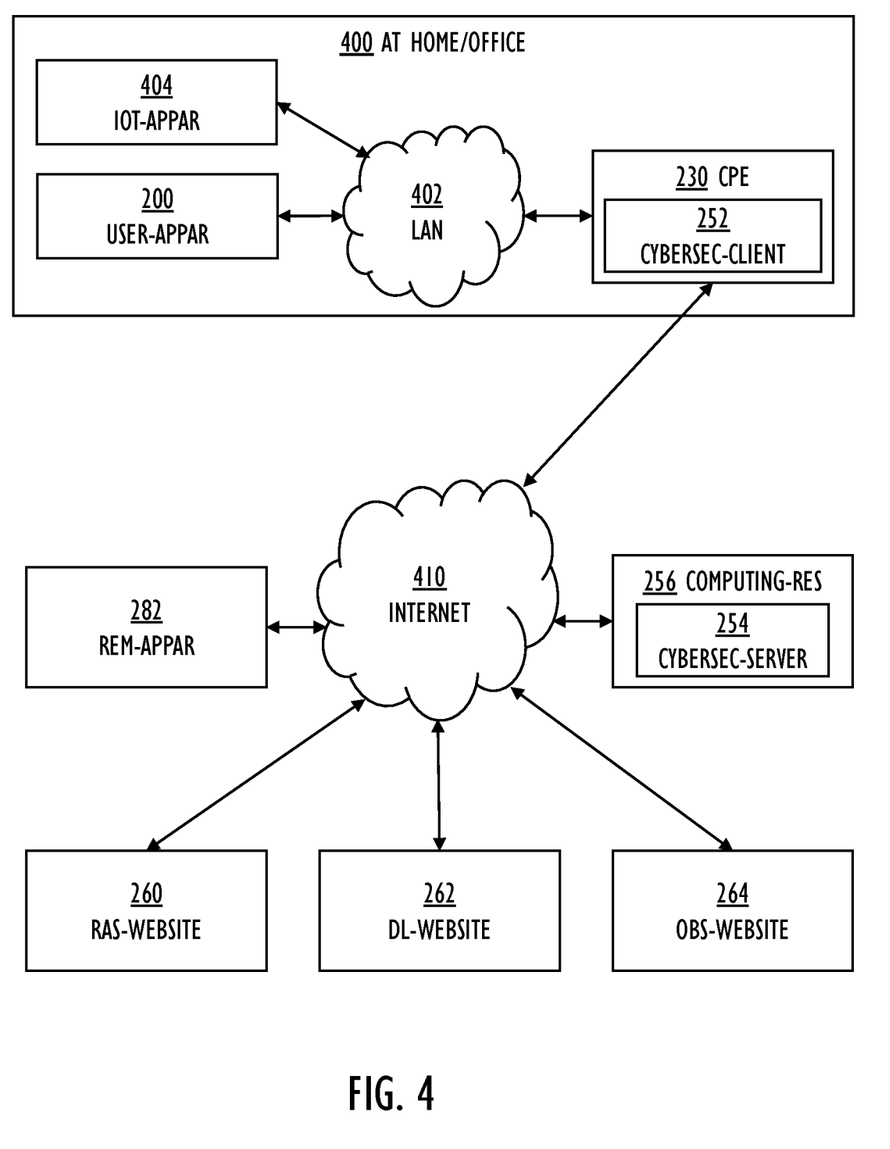
FIG. 4 is a block diagram illustrating an example operation environment.

FIG. 4 illustrates an example operation environment at home or office 400.

The Internet 410 uses the Internet protocol suite including TCP/IP and UDP/IP to globally connect computer networks so that communication is enabled between user apparatuses 200 and various services provided typically by websites 260, 262, 264. The Internet 410 comprises public networks, private networks, academic networks, business networks, government networks, etc. interlinked with various networking technologies. The various services provide access to vast World Wide Web (WWW) resources, wherein webpages may be written with Hypertext Markup Language (HTML) or Extensible Markup Language (XML) and accessed by a browser or another application (such as a mobile app) running in the user apparatus 200.

From the cybersecurity point of view, the Internet services may be divided between legitimate services and fraud services. Legitimate services operate according to moral and ethical standards enforced by law, police, or social pressure. Fraud services do not follow moral and ethical standards, and often perform criminal acts to disclose, steal or damage electronic data, software or hardware, or disrupt or misdirect services provided by the electronic data, software, and hardware. Fraud services may be fraudulent to the core, i.e., their only reason for existence is to perform malicious acts, but they may also be legitimate services as such, but being infected with malicious software so as to enable criminal acts. The criminal acts in general include, but are not limited to using a backdoor to bypass security mechanisms, make a denial-of-service attack (DoS), also as a distributed denial-of-service (DDoS), installing software worms or keylogger, eavesdropping a communication, phishing, spoofing, tampering, installing malware, etc. In the present examples, the criminal activities are enabled by the remote access software 204 in the user apparatus 200 of the legitimate user 210 when controlled by the remote access software 284 in the remote apparatus 282 of the scammer 280. Note that different service providers, such as network operators, cloud service operators, and cybersecurity operators, just to name a few, may operate and/or manage the various network nodes shown in FIG. 2.

Device identification, which may be defined as a capability to detect various apparatuses, such as the user apparatuses 200 and Internet of Things (IOT) apparatuses 404 with a home/office LAN 402, also increases the cybersecurity. Traditionally, a Medium/Media Access Control protocol (MAC) address is assigned by a device manufacturer and used in the data communication 220 (such as with wireless radio signals) within the LAN for the device identification. However, MAC randomization, which anonymizes and randomizes the MAC address to increase privacy, hinders the device identification based on the MAC address. Machine learning algorithms may use a number of other data items (such as device-specific unique radio interface characteristics, other current and historic unique identifiers related to the apparatus 200, 404 and its communication) to enable the device identification despite of the MAC randomization.

The CPE 230 is located at home or office 400 of a user of the user apparatus 200. CPE 230 is stationary equipment connected to a telecommunication circuit of a carrier (such as a broadband service provider) at a demarcation point. The demarcation point may be defined as a point at which the public Internet 410 ends and connects with a Local Area Network (LAN) 402 at the home or office of the user of the user apparatus 200. In this way, the CPE 230 acts as a network bridge.

The CPE 230 may include one or more functionalities of a router, a network switch, a residential gateway, a fixed mobile convergence product, a home networking adapter, an Internet access gateway, or another access product distributing the communication services locally in a residence or in an enterprise via a (typically wireless) LAN and thus enabling the user of the user apparatus 200 to access communication services of the broadband service provider, and the Internet 410. Note that the CPE 230 may also be implemented with wireless technology, such as a 5G CPE 230 configured to exchange a 5G cellular radio network signal with a base station operated by the broadband service provider, and generate a Wi-Fi® (or WLAN) or wired signal to implement the LAN 402 to provide access for the user apparatus 200. Furthermore, the 5G CPE 230 performs the conversion between the 5G cellular radio network signal and the Wi-Fi® or wired signal.

As shown in FIG. 4, besides the one or more user apparatuses 200, one or more IoT apparatuses 404 may be communicatively coupled with the LAN 402. The IoT apparatus 404 may include technology (sensors, communication technology, data processing) to enable smart appliances (lighting systems, thermostats, home security systems, remote health monitoring systems, smart fridges, smart toasters, etc.), IP cameras, or a network attached storage (NAS), for example.

Figure 5A:
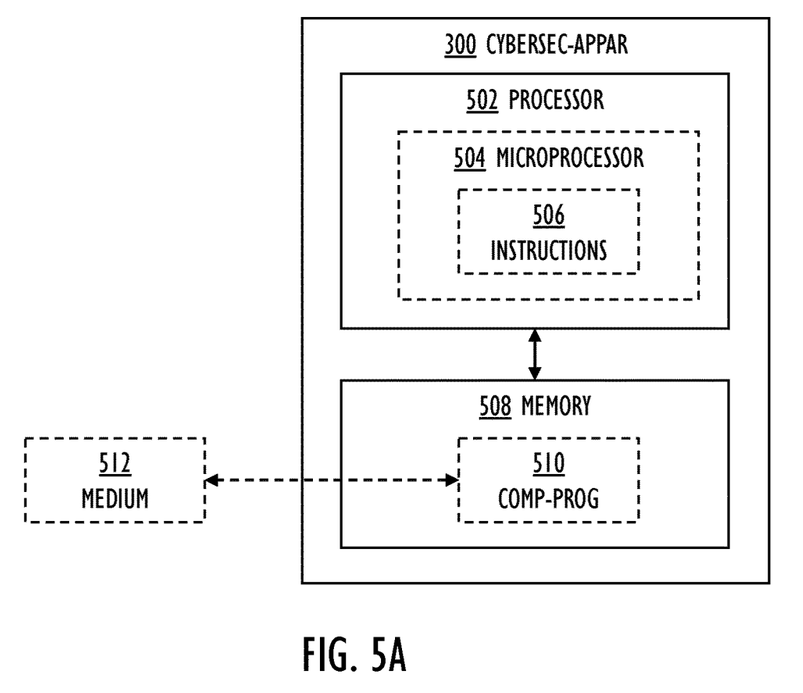
FIG. 5A and FIG. 5B are block diagrams illustrating examples of a cybersecurity apparatus.
Figure 5B:
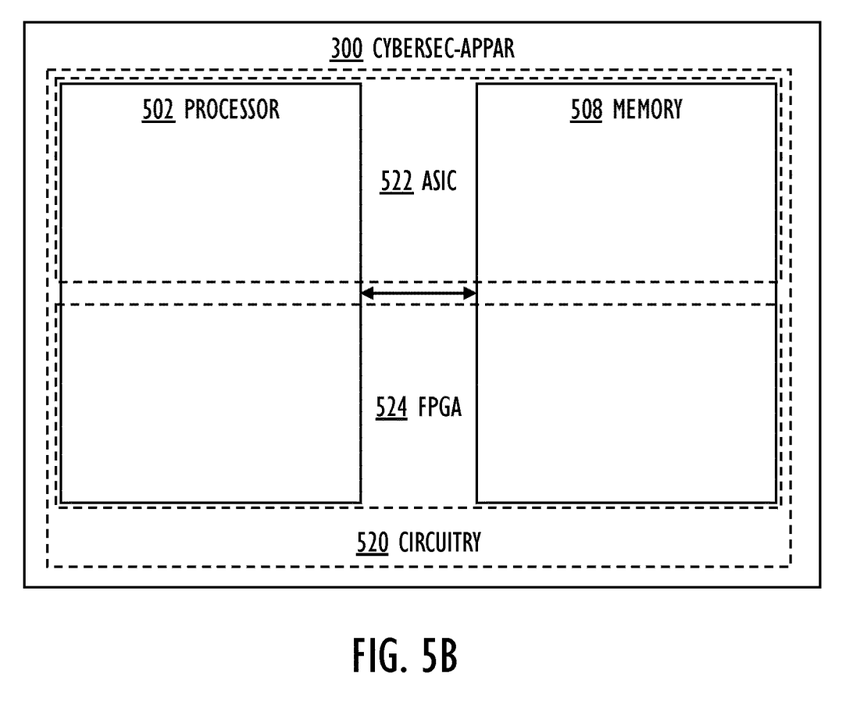

FIG. 5A and FIG. 5B illustrate examples of a cybersecurity apparatus 300, which is also illustrated in FIG. 3 as performing the operations of FIG. 1A and FIG. 1B.

The method described with reference to FIG. 1A and FIG. 1B may be implemented by the cybersecurity apparatus 300. The apparatus 300 may execute the operations defined in the method. The apparatus 300 may implement an algorithm, which includes at least the operations of the method, but may optionally include other operations related to the cybersecurity in general.

The apparatus 300 comprises one or more memories 508, and one or more processors 502 coupled to the one or more memories 508 configured to execute the operations described in FIG. 1A and FIG. 1B.

The term "processor" 502 refers to a device that is capable of processing data. The term "memory" 508 refers to a device that is capable of storing data run-time (=working memory) or permanently (=non-volatile memory).

As shown in FIG. 5A, the one or more processors 502 may be implemented as one or more microprocessors 504, which are configured to execute instructions 506 of a computer program 510 stored on the one or memories 508. The microprocessor 504 implements functions of a central processing unit (CPU) on an integrated circuit. The CPU is a logic machine executing the instructions 506 of the computer program 510. The CPU may comprise a set of registers, an arithmetic logic unit (ALU), and a control unit (CU). The control unit is controlled by a sequence of the instructions 506 transferred to the CPU from the (working)

memory 508. The control unit may contain a number of microinstructions for basic operations. The implementation of the microinstructions may vary, depending on the CPU design. The one or more microprocessors 504 may be implemented as cores of a single processor and/or as separate processors. Note that the term "microprocessor" is considered as a general term including, but not being limited to a digital signal processor (DSP), a digital signal controller, a graphics processing unit, a system on a chip, a microcontroller, a special-purpose computer chip, and other computing architectures employing at least partly microprocessor technology. The memory 508 comprising the working memory and the non-volatile memory may be implemented by a random-access memory (RAM), dynamic RAM (DRAM), static RAM (SRAM), a flash memory, a solid-state drive (SSD), PROM (programmable read-only memory), a suitable semiconductor, or any other means of implementing an electrical computer memory.

The computer program ("software") 510 may be written ("coded") by a suitable programming language, and the resulting executable code may be stored in the memory 508 and executed by the one or more microprocessors 504.

The computer program 510 implements the method/algorithm. The computer program 510 may be coded using a programming language, which may be a high-level programming language, such as Go, Java, C, or C++, or with a low-level programming language, such as an assembler or a machine language. The computer program 510 may be in source code form, object code form, executable file, or in some intermediate form, but for use in the one or more microprocessors 504 it is in an executable form as an application. There are many ways to structure the computer program 510: the operations may be divided into modules, sub-routines, methods, classes, objects, applets, macros, etc., depending on the software design methodology and the programming language used. In modern programming environments, there are software libraries, i.e., compilations of ready-made functions, which may be utilized by the computer program 510 for performing a wide variety of standard operations. In addition, an operating system (such as a general-purpose operating system) may provide the computer program 510 with system services.

As shown in FIG. 5A, a computer-readable medium 512 may store the computer program 510, which, when executed by the apparatus 300 (the computer program 510 may first be loaded into the one or more microprocessors 504 as the instructions 506 and then executed by one or more microprocessors 504), causes the apparatus 300 (or the one or more microprocessors 504) to carry out the method/algorithm. The computer-readable medium 512 may be implemented as a non-transitory computer-readable storage medium, a computer-readable storage medium, a computer memory, a computer-readable data carrier (such as an electrical carrier signal), a data carrier signal (such as a wired or wireless telecommunications signal), or another software distribution medium capable of carrying the computer program 510 to the one or memories 508 of the apparatus 300. In some jurisdictions, depending on the legislation and the patent practice, the computer-readable medium 512 may not be the wired or wireless telecommunications signal.

As shown in FIG. 5B, the one or more processors 502 and the one or more memories 508 may be implemented by a circuitry 520. A non-exhaustive list of implementation techniques for the circuitry 520 includes, but is not limited to application-specific integrated circuits (ASIC) 522, field-programmable gate arrays (FPGA) 524, application-specific standard products (ASSP), standard integrated circuits, logic components, and other electronics structures employing custom-made or standard electronic circuits.

Note that in modern computing environments a hybrid implementation employing both the microprocessor technology of FIG. 5A and the custom or standard circuitry of FIG. 5B is feasible.

Functionality of the apparatus 300, including the capability to carry out the method/algorithm, may be implemented in a centralized fashion by a stand-alone single physical unit, or alternatively in a distributed fashion using more than one communicatively coupled physical units. The physical unit may be a computer, or another type of a general-purpose off-the-shelf computing device, as opposed to a purpose-build proprietary equipment, whereby research and development costs will be lower as only the special-purpose software (and necessarily not the hardware) needs to be designed, implemented, tested, and produced. However, if highly optimized performance is required, the physical unit may be implemented with proprietary or standard circuitry as described earlier.

Figure 6:
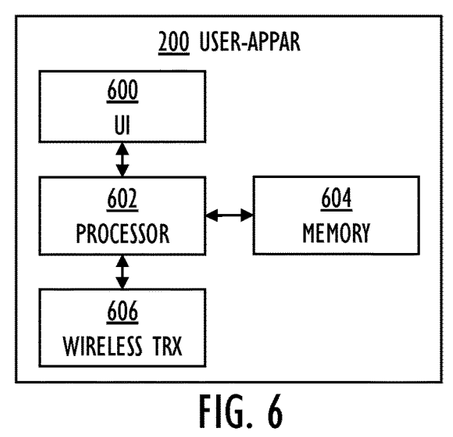
FIG. 6 is a block diagram illustrating an example of a user apparatus.

FIG. 6 illustrates an example of a user apparatus 200. The user apparatus 200 may be a terminal, a user equipment (UE), a radio terminal, a subscriber terminal, a smartphone, a mobile station, a mobile phone, a desktop computer, a portable computer, a laptop computer, a tablet computer, a smartwatch, smartglasses, or some other type of a wired or wireless mobile or stationary communication device operating with or without a subscriber identification module (SIM) or an embedded SIM (eSIM). The user apparatus 200 may be a personal communication device of the user 210. As shown in FIG. 6, the user apparatus 200 comprises one or more memories 604, and one or more processors 602 coupled to the one or more memories 604 configured to execute software on the user apparatus 200. In addition, the user apparatus 200 comprises a user interface 600 (such as a touch screen), and one or more wireless transceivers (such as a WLAN transceiver, a cellular radio network transceiver, and a short-range radio transceiver) 606.

Figure 7:
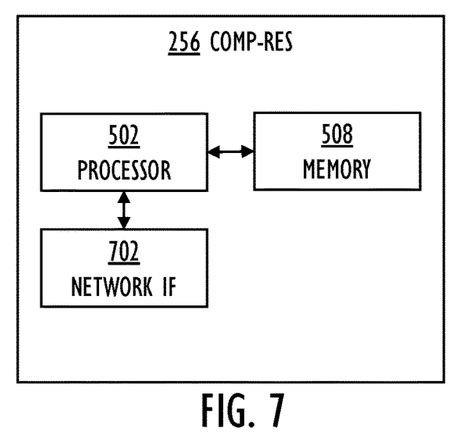
FIG. 7 is a block diagram illustrating an example of a computing resource.

FIG. 7 illustrates an example of a computing resource 256 such as a server apparatus as the apparatus 300. The server apparatus 256 may be a networked computer server, which interoperates with the CPE 230 according to a client-server architecture, a cloud computing architecture, a peer-to-peer system, or another applicable distributed computing architecture. As shown in FIG. 7, the server apparatus 256 comprises the one or more memories 508, and the one or more processors 502 coupled to the one or more memories 508 configured to carry out the method/algorithm. In addition, the server apparatus 256 comprises a network interface (such as an Ethernet network interface card) 702 configured to couple the server apparatus 256 to the Internet 410. As shown in FIG. 4, the computing resource 256 may be running a cybersecurity application 254, such as a cybersecurity server application 254.

Figure 8A:
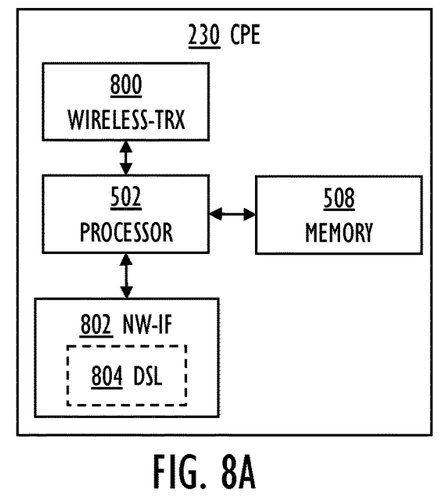
FIG. 8A and FIG. 8B are block diagrams illustrating examples of a customer-premises equipment.
Figure 8B:
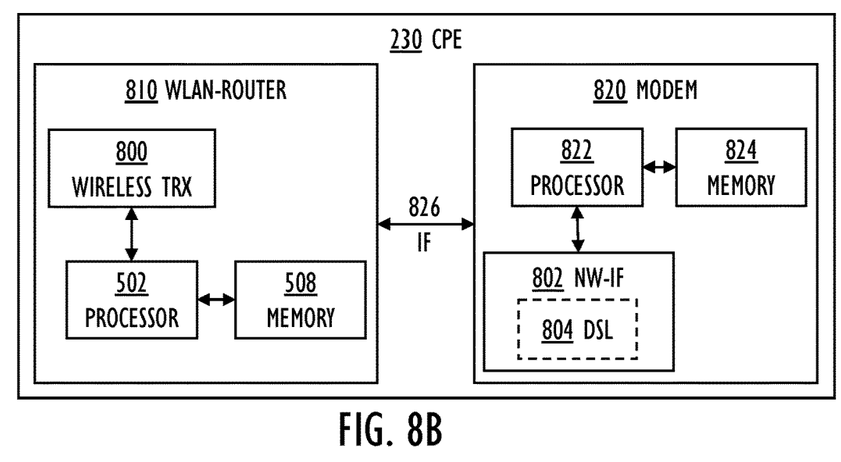

FIG. 8A and FIG. 8B illustrate examples of a customer-premises equipment 230 as the apparatus 300.

In FIG. 8A, the CPE 230 is an integrated apparatus comprising the one or more memories 508, and the one or more processors 502 coupled to the one or more memories 508 configured to carry out the method/algorithm. Additionally, the CPE 230 comprises a wireless radio transceiver 800 configured to create the WLAN 402 for enabling access by the user apparatus 200. The CPE 230 also comprises a network interface 802 to act as a modem configured to connect to the telecommunication circuit of the carrier at the demarcation point. The network interface 802 may operate as a Digital Subscriber Line (DSL) modem 804 using different variants such as Very high bitrate DSL (VDSL), Symmetric DSL (SDSL), or Asymmetric DSL (ADSL). As shown in FIG. 4, the CPE 230 may be running a cybersecurity application 252, such as a cybersecurity client application 252.

In FIG. 8B, the CPE 230 is a two-part apparatus. A WLAN router part 810 comprises the one or more memories 508, the one or more processors 502 coupled to the one or more memories 508 configured to carry out the method/algorithm, and the wireless transceiver 800 to create the WLAN 402 for enabling access by the user apparatus 200. A modem part 820 comprises one or more processors 822 coupled to one or more memories 824 configured to carry out modem operations, and the network interface 802 to act as the modem configured to connect to the telecommunication circuit of the carrier at the demarcation point. The WLAN router part 810 may be purchased by the user of the user apparatus 200 to gain access to the method/algorithm, whereas the modem part 820 may be provided by carrier providing the telecommunication circuit access. As shown in FIG. 8B, the WLAN router part 810 and the modem part 820 may be communicatively coupled by an interface 826 (such as a wired Ethernet interface).

As illustrated in FIG. 4, the functionality of the apparatus 300, including the capability to carry out the method/algorithm, may be implemented in a centralized fashion by a stand-alone single physical unit, or alternatively in a distributed fashion using more than one communicatively coupled physical units.

These physical units comprise the CPE 230 running a cybersecurity client application 252, and the computing resource 256 running a cybersecurity server application 254. The method/algorithm operations may be implemented by one or more of these apparatuses 230/256 executing the cybersecurity applications 252/254.

As can be understood by the person skilled in the art, the method/algorithm operations may be distributed among the distributed software comprising the cybersecurity client application 252, and the cybersecurity server application 254 in different configurations. In an example, the cybersecurity client application 252 communicates with the cybersecurity server application 254 to implement the method/algorithm functionality.

Thus, the cybersecurity client application 252 may comprise a stand-alone fashion to carry out the method/algorithm, or a part of the functionality augmented by the functionality of the cybersecurity server application 254. The cybersecurity client application 252 may operate as a frontend with a relatively limited resources as regards to the processor and memory, whereas the cybersecurity server application 254 may operate as a backend with a relatively unlimited resources as regards to the processor and memory, and the capability to serve a very large number of the user apparatuses 200 simultaneously.

Even though the invention has been described with reference to one or more examples according to the accompanying drawings, it is clear that the invention is not restricted thereto but can be modified in several ways within the scope of the appended claims. All words and expressions should be interpreted broadly, and they are intended to illustrate, not to restrict, the examples. As technology advances, the inventive concept defined by the claims can be implemented in various ways.

What is claimed is:

1. A computer-implemented method comprising:
   intercepting, by a customer-premises equipment (CPE), data communication between a user apparatus via the CPE and one or more destination apparatuses, wherein the CPE implements a local area network for the data communication of the user apparatus;
   detecting a download of remote access software to the user apparatus;
   detecting, in the data communication, first network traffic related to the remote access software in the user apparatus, the first network traffic comprising content that is indicative of network traffic associated with the remote access software;
   detecting, in the data communication, second network traffic related to an online banking software in the user apparatus;
   determining that the first network traffic and the second network traffic coincide;
   in response to determining that the first network traffic and the second network traffic coincide, blocking the first network traffic related to the remote access software in the user apparatus via the CPE;
   setting a first timestamp to a point in time when the download was detected;
   setting a second timestamp to a point in time when the first network traffic related to the remote access software was detected;
   determining that a time difference between the first timestamp and the second timestamp fulfills a predetermined time difference condition; and
   determining that the first network traffic and the second network traffic coincide in response to determining that the time difference between the first timestamp and the second timestamp fulfills the predetermined time difference condition.

2. The method of claim 1, further comprising:
   in response to determining that the first network traffic and the second network traffic coincide, blocking the second network traffic related to the online banking software in the user apparatus via the CPE.

3. The method of claim 1, wherein detecting, in the data communication, the first network traffic related to the remote access software in the user apparatus further comprises:
   detecting the first network traffic as a part of the data communication related to an address matching with a target address in a set of target addresses associated with the remote access software.

4. The method of claim 1, wherein detecting, in the data communication, the first network traffic related to the remote access software in the user apparatus further comprises:
   detecting the first network traffic as a connection between the user apparatus and an address matching with a target address in a set of target addresses associated with the remote access software.

5. The method of claim 4, wherein detecting the first network traffic as the connection between the user apparatus and the address matching with the target address in the set of target addresses associated with the remote access software further comprises at least one of the following:
   determining that a port defined in the connection matches with a port in a set of ports associated with the remote access software; and
   determining that a communication protocol used for the connection matches with a communication protocol in a set of communication protocols associated with the remote access software.

6. The method of claim 1, wherein detecting, in the data communication, the first network traffic related to the remote access software in the user apparatus further comprises at least one of the following:

detecting the first network traffic as a connection being held open between the user apparatus and an address matching with a target address in a set of target addresses associated with the remote access software;

detecting the first network traffic based on predetermined traffic patterns indicative of the remote access software; and detecting the first network traffic based on predetermined features indicative of the remote access software in a proprietary communication protocol, or a standard communication protocol.

7. The method of claim 1, wherein detecting the download of the remote access software to the user apparatus further comprises at least one of the following:

determining that software is downloaded from a website matching with a website in a set of websites associated with the remote access software; and determining that an identifier of the software matches with an identifier in a set of identifiers associated with the remote access software.

8. The method of claim 1, wherein detecting, in the data communication, the second network traffic related to the online banking software in the user apparatus further comprises:

detecting the second network traffic as a part of the data communication, the part of the data communication being related to an address matching with a target address in a set of target addresses associated with the online banking software.

9. The method of claim 1, wherein detecting, in the data communication, the second network traffic related to the online banking software in the user apparatus further comprises:

detecting as the second network traffic, a connection between the user apparatus and an address matching with a target address in a set of target addresses associated with the online banking software.

10. The method of claim 1, further comprising:

determining whether the first network traffic is active in response to detecting, in the data communication, the second network traffic related to the online banking software in the user apparatus; and in response to determining that the first network traffic is active, determining that the first network traffic and the second network traffic coincide.

11. The method of claim 1, further comprising:

in response to detecting, in the data communication, the first network traffic related to the remote access software in the user apparatus, performing a search to detect, in the data communication, the second network traffic related to the online banking software in the user apparatus.

12. The method of claim 1, further comprising:

retrieving a vulnerability estimate for a user of the user apparatus; and determining that the vulnerability estimate fulfills a predetermined vulnerability condition, and wherein, in response to determining that the first network traffic and the second network traffic coincide, blocking the first network traffic related to the remote access software in the user apparatus via the CPE further comprises:

in response to determining that the first network traffic and the second network traffic coincide and determining that the vulnerability estimate fulfills the predetermined vulnerability condition, blocking the first network traffic related to the remote access software in the user apparatus via the CPE.

13. The method of claim 1, further comprising:

subsequent to blocking the first network traffic related to the remote access software in the user apparatus via the CPE, instructing the user apparatus to disable the remote access software in the user apparatus.

14. A customer-premises equipment (CPE) comprising:

one or more memories; and one or more processors coupled to the one or more memories configured to:

intercept data communication between a user apparatus and one or more destination apparatuses, wherein the CPE is operable to implement a local area network for the data communication of the user apparatus;

detect a download of remote access software to the user apparatus;

detect, in the data communication, first network traffic related to the remote access software in the user apparatus, the first network traffic comprising content that is indicative of network traffic associated with the remote access software;

detect, in the data communication, second network traffic related to an online banking software in the user apparatus;

determine that the first network traffic and the second network traffic coincide;

in response to determining that the first network traffic and the second network traffic coincide, block the first network traffic related to the remote access software in the user apparatus;

set a first timestamp to a point in time when the download was detected;

set a second timestamp to a point in time when the first network traffic related to the remote access software was detected;

determine that a time difference between the first timestamp and the second timestamp fulfills a predetermined time difference condition; and determine that the first network traffic and the second network traffic coincide in response to determining that the time difference between the first timestamp and the second timestamp fulfills the predetermined time difference condition.

15. The CPE of claim 14, wherein to detect, in the data communication, the first network traffic related to the remote access software in the user apparatus, the one or more processors coupled to the one or more memories are further configured to perform at least one of the following:

detect the first network traffic as a connection being held open between the user apparatus and an address matching with a target address in a set of target addresses associated with the remote access software;

detect the first network traffic based on predetermined traffic patterns indicative of the remote access software; and detect the first network traffic based on predetermined features indicative of the remote access software in a proprietary communication protocol, or a standard communication protocol.

16. The CPE of claim 14, wherein the one or more processors coupled to the one or more memories are further configured to:

determine whether the first network traffic is active in response to detecting, in the data communication, the second network traffic related to the online banking software in the user apparatus; and in response to determining that the first network traffic is active, determine that the first network traffic and the second network traffic coincide.

17. A non-transitory computer-readable medium comprising a computer program with instructions which, when executed by a customer-premises equipment (CPE), cause the CPE to:

intercept data communication between a user apparatus and one or more destination apparatuses, wherein the CPE is operable to implement a local area network for the data communication of the user apparatus;

detect a download of remote access software to the user apparatus;

detect, in the data communication, first network traffic related to the remote access software in the user apparatus, the first network traffic comprising content that is indicative of network traffic associated with the remote access software;

detect, in the data communication, second network traffic related to an online banking software in the user apparatus;

determine that the first network traffic and the second network traffic coincide;

in response to determining that the first network traffic and the second network traffic coincide, block the first network traffic related to the remote access software in the user apparatus via the CPE;

set a first timestamp to a point in time when the download was detected;

set a second timestamp to a point in time when the first network traffic related to the remote access software was detected;

determine that a time difference between the first timestamp and the second timestamp fulfills a predetermined time difference condition; and determine that the first network traffic and the second network traffic coincide in response to determining that the time difference between the first timestamp and the second timestamp fulfills the predetermined time difference condition.

18. The medium of claim 17, wherein to detect, in the data communication, the first network traffic related to the remote access software in the user apparatus, the instructions further cause the CPE to perform at least one of the following:

detect the first network traffic as a connection being held open between the user apparatus and an address matching with a target address in a set of target addresses associated with the remote access software;

detect the first network traffic based on predetermined traffic patterns indicative of the remote access software; and detect the first network traffic based on predetermined features indicative of the remote access software in a proprietary communication protocol, or a standard communication protocol.

19. The medium of claim 17, wherein the instructions further cause the CPE to:

determine whether the first network traffic is active in response to detecting, in the data communication, the second network traffic related to the online banking software in the user apparatus; and in response to determining that the first network traffic is active, determine that the first network traffic and the second network traffic coincide.

20. A computer-implemented method comprising:

intercepting, by a customer-premises equipment (CPE), data communication between a user apparatus via a customer-premises equipment (CPE) and one or more destination apparatuses, wherein the CPE implements a local area network for the data communication of the user apparatus;

detecting, in the data communication, first network traffic related to a remote access software in the user apparatus, the first network traffic comprising content that is indicative of network traffic associated with the remote access software;

detecting, in the data communication, second network traffic related to an online banking software in the user apparatus;

in response to detecting, in the data communication, the first network traffic related to the remote access software in the user apparatus, performing a search to detect, in the data communication, the second network traffic related to the online banking software in the user apparatus;

determining that the first network traffic and the second network traffic coincide; and in response to determining that the first network traffic and the second network traffic coincide, blocking the first network traffic related to the remote access software in the user apparatus via the CPE.

21. A customer-premises equipment (CPE) comprising:
one or more memories; and
one or more processors coupled to the one or more memories configured to:

intercept data communication between a user apparatus and one or more destination apparatuses, wherein the CPE is operable to implement a local area network for the data communication of the user apparatus;

detect, in the data communication, first network traffic related to a remote access software in the user apparatus, the first network traffic comprising content that is indicative of network traffic associated with the remote access software;

detect, in the data communication, second network traffic related to an online banking software in the user apparatus;

in response to detecting, in the data communication, the first network traffic related to the remote access software in the user apparatus, perform a search to detect, in the data communication, the second network traffic related to the online banking software in the user apparatus;

determine that the first network traffic and the second network traffic coincide; and in response to determining that the first network traffic and the second network traffic coincide, block the first network traffic related to the remote access software in the user apparatus.

22. A non-transitory computer-readable medium comprising a computer program with instructions which, when executed by a customer-premises equipment (CPE), cause the CPE to:

intercept data communication between a user apparatus and one or more destination apparatuses, wherein the CPE is operable to implement a local area network for the data communication of the user apparatus;

detect, in the data communication, first network traffic related to a remote access software in the user apparatus, the first network traffic comprising content that is indicative of network traffic associated with the remote access software;

detect, in the data communication, second network traffic related to an online banking software in the user apparatus;

in response to detecting, in the data communication, the first network traffic related to the remote access software in the user apparatus, perform a search to detect, in the data communication, the second network traffic related to the online banking software in the user apparatus;

determine that the first network traffic and the second network traffic coincide; and in response to determining that the first network traffic and the second network traffic coincide, block the first network traffic related to the remote access software in the user apparatus via the CPE.

* * * * *